United States Patent [19]
Cividino et al.

[11] Patent Number: 5,869,969
[45] Date of Patent: Feb. 9, 1999

[54] BATTERY CHARGER/RECTIFIER VOLTAGE TEMPERATURE COMPENSATION CIRCUIT INCLUDING PROTECTION AND DIAGNOSTIC SCHEME

[75] Inventors: Lorenzo Cividino; Giampaolo Carli, both of Franklin, Mass.

[73] Assignee: Northern Telecom Limited, Montreal, Canada

[21] Appl. No.: 747,824

[22] Filed: Nov. 13, 1996

[51] Int. Cl.$^6$ .................................................. G01N 27/42
[52] U.S. Cl. .......................... 324/431; 324/433; 320/35; 340/636
[58] Field of Search .............................. 320/35; 340/636; 324/431, 433

[56] References Cited

U.S. PATENT DOCUMENTS

| | | |
|---|---|---|
| 3,307,101 | 2/1967 | Byles ...................................... 324/431 |
| 4,027,231 | 5/1977 | Lohrman ................................. 324/431 |
| 4,663,580 | 5/1987 | Wortman . |
| 4,816,768 | 3/1989 | Champlin ................................ 324/431 |
| 5,250,904 | 10/1993 | Salander et al. . |
| 5,307,001 | 4/1994 | Heavey . |
| 5,352,968 | 10/1994 | Reni ........................................ 324/431 |
| 5,592,094 | 1/1997 | Ichikawa ................................ 324/431 |

FOREIGN PATENT DOCUMENTS

94/05069  3/1994  WIPO .

*Primary Examiner*—Josie Ballato
*Assistant Examiner*—Jose M. Solis
*Attorney, Agent, or Firm*—Foley & Lardner

[57] ABSTRACT

A temperature compensation module for use with battery charger/rectifier units. The compensation module is used to vary the battery charger output voltage as a function of temperature. This is done by controlling the series impedance of the charger's voltage sense leads. The impedance is controlled to produce a voltage offset in series with the sense leads. Thus, the charger's output voltage is equal to its adjusted output voltage plus the offset voltage.

6 Claims, 12 Drawing Sheets

BATTERY CHARGER/RECTIFIER VOLTAGE TEMPERATURE COMPENSATION CIRCUIT INCLUDING PROTECTION AND DIAGNOSTIC SCHEME

FIELD OF THE INVENTION

This invention relates to battery chargers and more particularly to such chargers for varying the rectifier voltage in order to match it to battery manufacturer recommended float levels as a function of local ambient temperature.

BACKGROUND OF THE INVENTION

Batteries as principal or back-up power sources have numerous applications in such industries as computer technology and telecommunications. In these applications it is important that the battery be maintained at a fully charged condition in order to function properly.

One particular application for batteries is as an emergency power source for telecommunication equipment located outdoors. If the regular power supplied by an a.c. source fails, the battery must be able to provide the necessary voltage until such time as the a.c. power is restored. It is common in such applications that a battery charger be connected across the batteries such that they are constantly maintained at the proper voltage levels.

It is known that the resistance of batteries varies as a function of ambient temperature conditions such that charging levels, if kept constant, would either provide insufficient or excessive charging or float voltage. This can result either in an under-charged battery if a low float voltage is provided, or possibly a damaged battery if excessive voltage is applied. It is therefore a requirement to control the float voltage in response to changes in ambient temperature.

PRIOR ART

The prior art includes several patents directed to proposed solutions to the aforementioned requirement.

U.S. Pat. No. 4,663,580, which issued May 5, 1987 to Wortman, discloses a power supply with a predetermined non-linear temperature coefficient for float charging sealed lead-acid batteries. It, however, has as an objective the provision of temperature compensation for only one charger.

U.S. Pat. No. 5,250,904, issued Oct. 5, 1993 to Salander et al, discloses a battery testing device for measuring imminent battery failure while the battery is in a float mode. The teaching of this patent, however, does not include a universal temperature compensation device.

U.S. Pat. No. 5,307,001, which issued Apr. 26, 1994 to Heavey, relates to a battery charger employing the gassing point of a lead-acid battery to determine the end of charge time and voltage.

International Application published Mar. 3, 1994 under Publication No. WO94/05069 naming McFadden and Nowicki as inventors, relates to a temperature compensating device to regulate the output voltage of a rectifier or charger. The device employs a temperature sensing unit physically mounted on the battery to sense the temperature of the battery. The temperature compensation voltage regulation follows a linear graph over the intended temperature range.

SUMMARY OF THE INVENTION

The present invention relates to a temperature compensation module (TCM) which is used to vary the battery charger (rectifier) output voltage as a function of temperature. The TCM does this by controlling the series impedance of the charger's voltage sense leads. The impedance is controlled to produce a voltage offset in series with the sense leads. Therefore the charger's output voltage is equal to its adjusted output voltage (internal reference) plus the offset voltage.

The TCM of the present invention includes the following features: low component count and low cost; high output capability (current source); separate module and does not require modification to charger; can be applied to most conventional constant voltage chargers and more than one at a time; has an analog circuit which does not generate electromagnetic interference; and uses in a preferred embodiment a power MOSFET as a pass element resulting in low power consumption and reduced parts count.

In addition to the temperature compensation function, the device of the present invention also includes the following features: overcurrent detection; fail alarm; default pass element; remote disable; high/low voltage limiter; high temperature alarm; and foldback.

Therefore in accordance with a first and broad aspect of the present invention there is provided a temperature compensating device for use with a battery charger to control the charging float voltage of a battery connected to the charger as a function of ambient temperature. The device has a pair of sense leads connected to sense lead terminals on the charger and across impedance means in series with a battery to be charged. The device also includes means to vary the impedance of the impedance means in response to a change in the ambient temperature. In a preferred embodiment the means to vary the impedance is a transistor such as a MOSFET. A temperature dependent device such as a thermistor is used to generate a temperature dependent voltage reference.

BRIEF DESCRIPTION OF THE DRAWINGS

The invention will now be described in greater detail with particular reference to the attached drawings wherein.

DETAILED DESCRIPTION OF THE INVENTION

Figure 1:
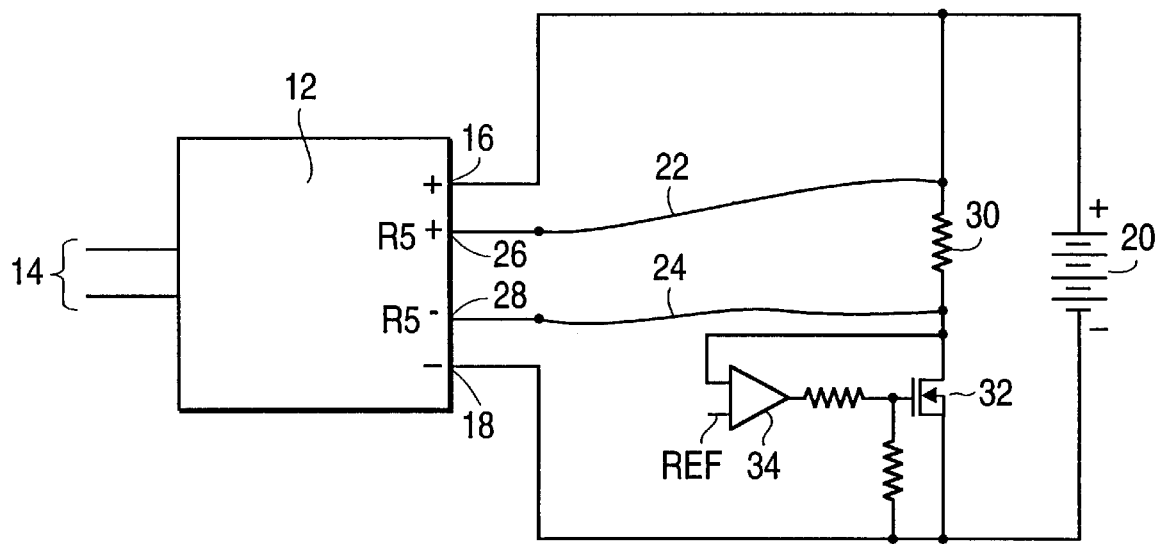
FIG. 1 is a schematic diagram of the TMC connected between a charger and a battery to be charged.

FIG. 1 illustrates a basic implementation of the temperature compensation unit according to the present invention. In FIG. 1, charger or rectifier 12 is supplied with a.c. voltage via a.c. terminals 14. The a.c. voltage is rectified and converted in the charger 12 as is well known in the art. A d.c. voltage is provided at battery terminals 16 and 18 with a positive voltage at 16 and a negative voltage at 18. This voltage is supplied across the positive and negative terminals of battery 20. Sense leads 22 and 24 are connected to sense lead terminals 26 and 28 on the charger 12. In a preferred embodiment the battery positive terminal 16 and the positive sense lead terminal 26 are tied together within the charger. The sense leads 22 and 24 are connected to resistor 30 which is in series with pass element 32, the operation of which is described in greater detail in connection with FIG. 2.

Figure 2:
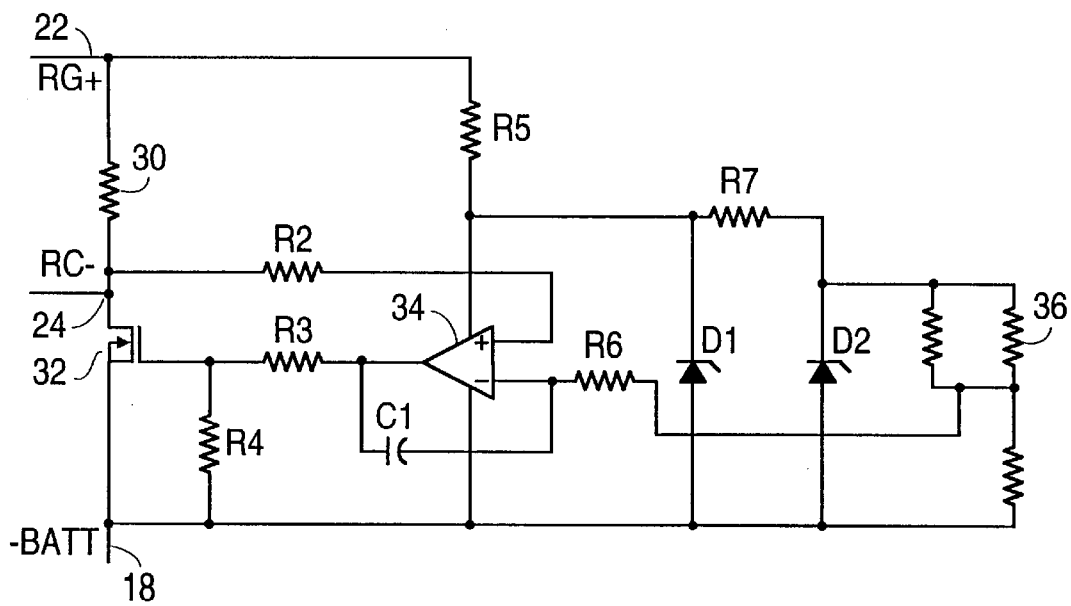
FIG. 2 is a circuit diagram of the pass element and control unit.

As shown in FIG. 2, pass element 32 is a transistor such as a power MOSFET. MOSFET 32 is driven by an error amplifier 34 which controls the MOSFET gate voltage in order to maintain the MOSFET drain voltage equal to the error amplifier's reference voltage. The MOSFET source to drain voltage is generated by the charger's sense lead current flowing through the MOSFET's internal resistance and hence generating a voltage drop. The error amplifier 34 modulates the MOSFET's gate voltage to maintain it constant with varying sense lead current. The reference voltage supplied to the −terminal of error amplifier 34 varies as a function of temperature and exhibits a negative temperature coefficient compatible with lead acid batteries being charged. The temperature dependent voltage reference is generated by thermistor 36.

Figure 3:
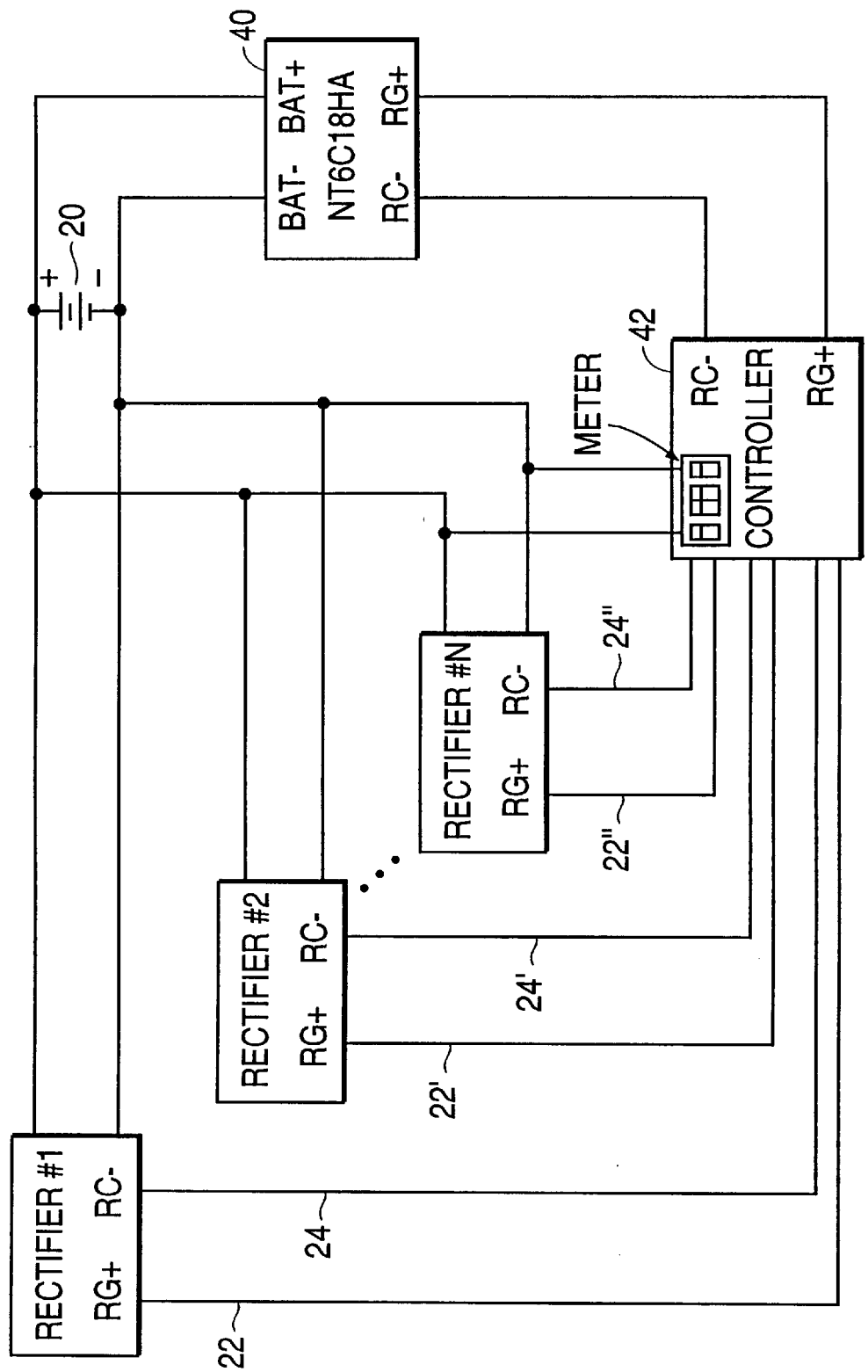
FIG. 3 is a block diagram of a typical implementation of the TMC controlling a number of chargers or rectifiers.

FIG. 3 illustrates an implementation of the TMC of the present invention in which a number of rectifiers are employed. These are identified as rectifiers 1,2 . . . n in FIG. 3, each supplying a charging voltage to battery 20. The sense lead of each 22,24; 22'24'; 22"24" are connected to the TMC unit 40 via controller 42. It is to be understood, however, that controller 42 is not essential to the operation of the device. Essentially the TMC unit or device 40 is a temperature dependent impedance which is placed in series with the negative (−48V) sense leads of the power plant's rectifiers. The internal circuitry and sensor produce a linear decrease with temperature causing the output voltage of the plant's rectifier to equally decrease, thus obtaining compensation. The only adjustment needed at the rectifiers is their default float voltage (i.e., the voltage measured at the rectifier's terminals with the sense leads disconnected) which must be set at −48V for proper operation. As indicated previously the terminal designated RG+ in FIG. 3 is internally connected to BAT+. A temperature controlled voltage drop is generated between terminal RC− and terminal BAT− ranging between 2V to approximately 7.6V.

Three temperature compensation slopes can be selected as will be described later.

Figure 4:
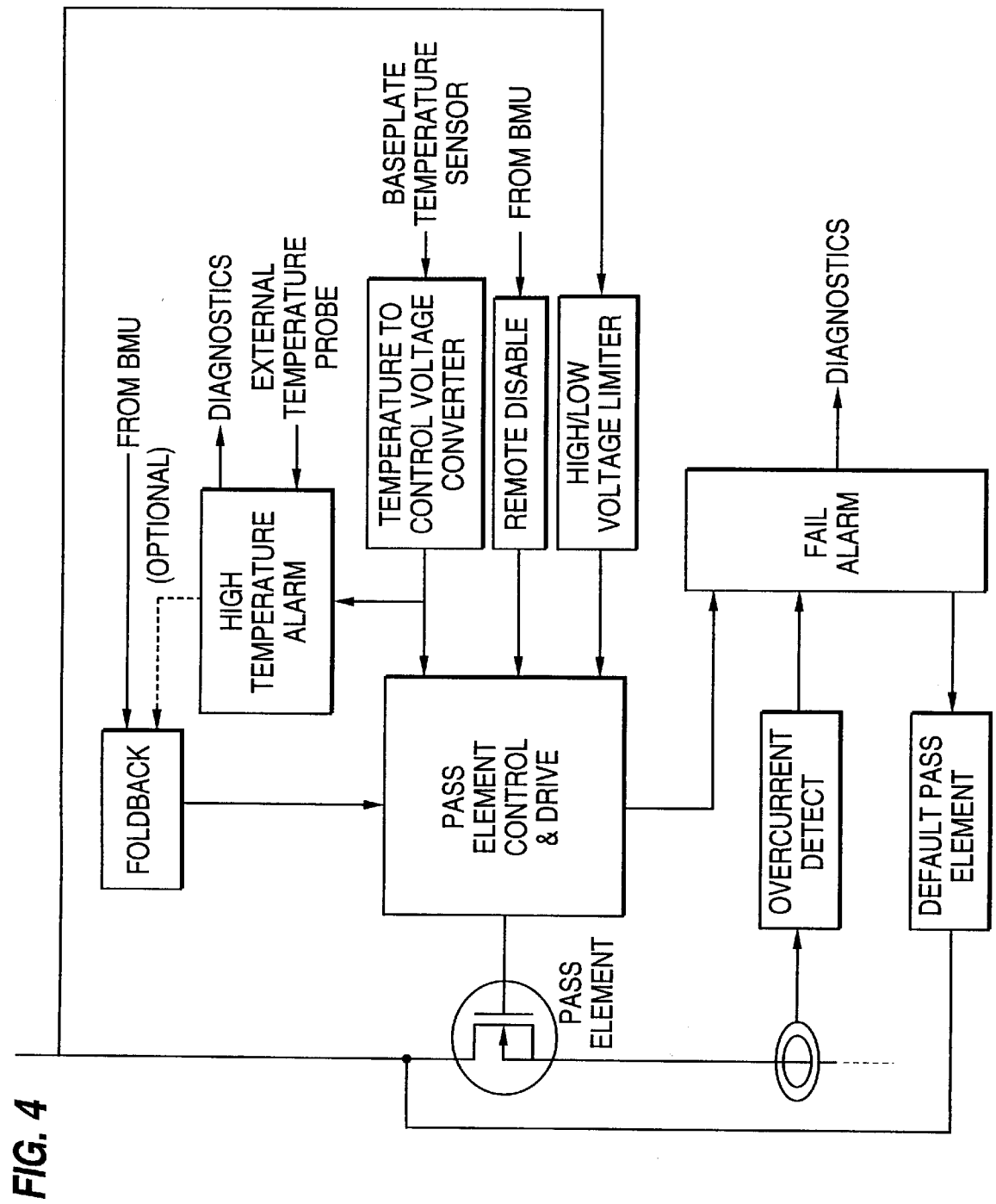
FIG. 4 is a block diagram of the TMC in conjunction with protection and diagnostic functions.

In addition to the temperature compensation function of the temperature compensation module, the present invention also incorporates several additional features. The basic unit includes three basic blocks, namely: a pass element; pass element control and drive; and temperature to control voltage converter. These are illustrated in block diagram form in FIG. 4. FIG. 4 also illustrates other protection and diagnostic functions of the present invention which will now be described in greater detail.

1. Overcurrent Detection is a standard circuit for detecting overloading or bad connection during installation. A special circuit allows the user to recognize overcurrent condition by flashing RED/GREEN bichrome LED. Other failure events result in the LED turning RED steadily.

2. Fail Alarm detects failure of the Pass Element or the Pass Element Control and Drive Circuit. This results in the diagnostic LED turning RED. This circuit also accepts the overcurrent detection signal and responds by flashing the LED as explained above. Besides the LED, a set of relay contacts trips as a consequence of failure detection to provide more diagnostic capability.

3. Default Pass Element: This is an alternate pass element which is fixed in voltage drop. It replaces the controlled Pass Element in case of unit failure, avoiding excessive or insufficient battery float voltages.

4. Remote Disable: This circuit can be used to provoke a deep discharge of the battery for testing purposes by significantly lowering the rectifier's voltage. Typically, this occurrence is started by a Battery Monitoring Unit (BMU) or equivalent system controller.

5. High/Low Voltage Limiter: This circuit limits the compensation to within a band. This prevents the batteries to overcharge at very low temperatures, or excessively discharge at high temperatures.

6. High Temperature Alarm: This circuit uses the sensed temperature and produces an alarm (relay contact closures) if it exceeds a pre-selected value. If a special external temperature probe is connected to the TCM unit, the circuit automatically senses the difference in temperature between the baseplate and the probe, rather than the absolute ambient temperature. Since a temperature difference between ambient and batteries may be indicative of battery failure, this feature can be used as a battery failure detector.

7. Foldback: This circuit responds to inputs from a BMU. It forces the battery voltage to decrease by some step value. It is intended to be a response by the BMU to a detection of battery stress. This function can also be set up by the user to respond automatically to a High Temperature Alarm occurrence. This allows an automatic reduction of battery stress when either high ambient temperature or high temperature differential between battery and ambient is detected.

The design objective is to provide the means to control the output voltage of a string of batteries as a pre-defined function of temperature. This function is a decreasing slope with temperature (the slope will be selectable to various levels) clamped at the high end (low temperature) to prevent overvoltage, and at the low end (high temperature) to maintain battery capacity.

THE PASS ELEMENT

Figure 5:
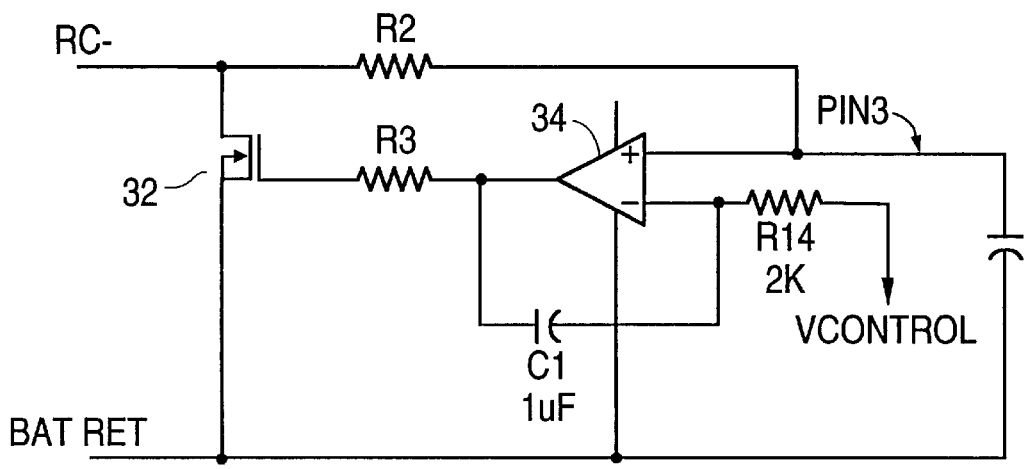
FIG. 5 is a schematic diagram of the control operational amplifier circuit.
Figure 6:
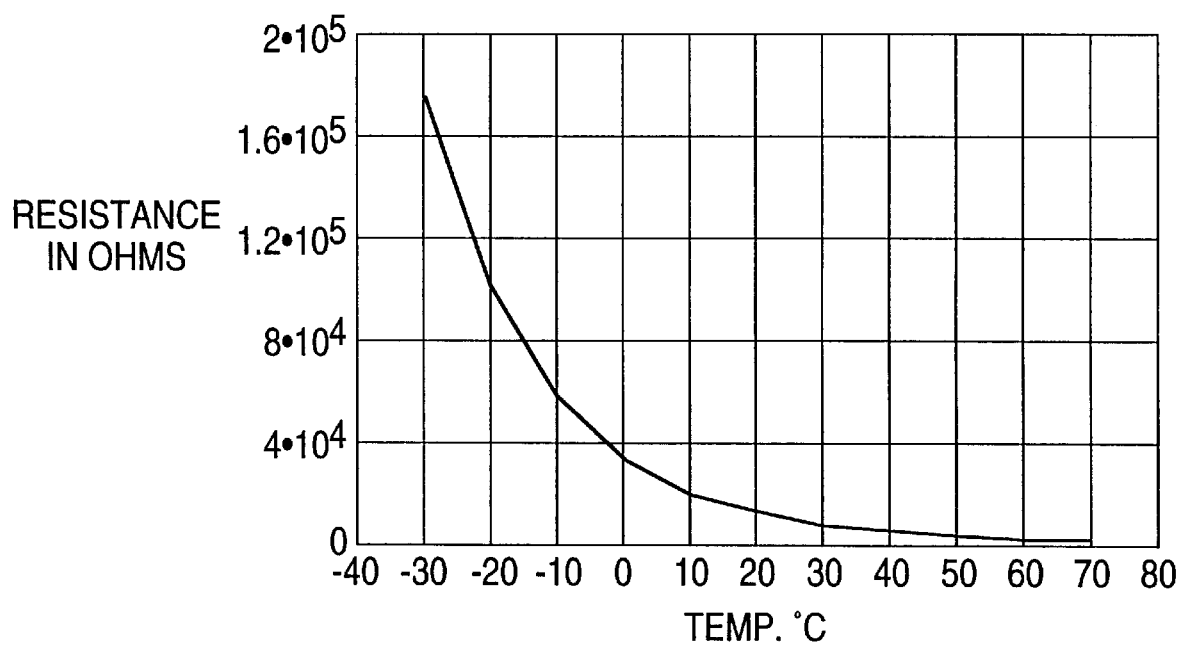
FIG. 6 is a graph of the value of the resistance of the temperature dependent thermistor as a function of ambient temperature.

The design is based on a pass element—a transistor of sorts—to create a controlled incremental voltage on the sense leads. The circuit of FIG. 5 is the heart of the TCM. It consists of the pass element per se (32) controlled by an op amp 34 compensated to respond only to very low frequencies. This will eliminate any interactions with the rectifiers loop. R2, in conjunction with the inverting action of pass element 32 produces a negative feedback. Since no appreciable DC current is flowing in it, and assuming a virtual short between the inputs of the op amp, the voltage at the collector of 32 will equal Vcontrol.

Vcontrol is generated by a network which includes a thermistor 36. This network increases Vcontrol approximately linearly with temperature.

TEMPERATURE SENSING

Figure 7:
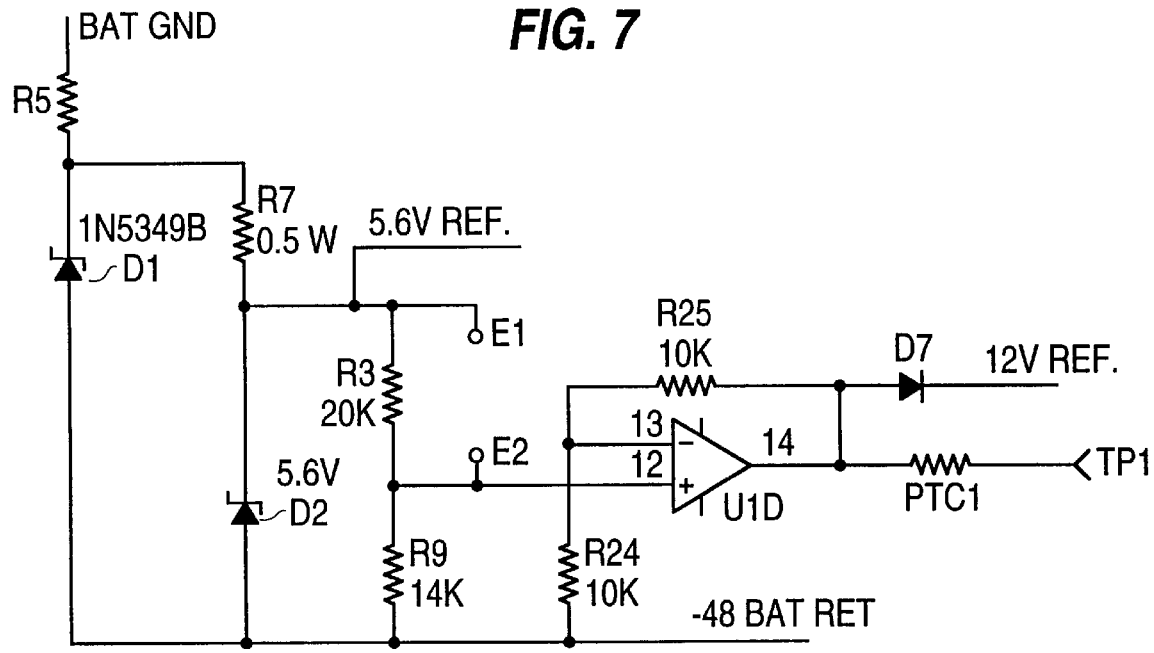
FIG. 7 is a schematic diagram of the thermal sensing circuit.

The absolute temperature is sensed by using a thermistor 36 in order to generate the approximate Vcontrol. The circuit shown in FIG. 7 will do this task. Assuming a tolerance of 1% on all resistors including the thermistor, and the use of a temperature compensated adjustable zener, the worst accuracy will occur at low temperatures and will be of ±2.5 degrees. The voltage measurable externally at TP1 will have a ±3 degrees accuracy.

The thermistor 36 would be located between E1 and E2. The function of voltage at E2, as a function of temperature, is given in FIG. 8. Note that the linearity is quite good between 0 degrees and 60 degrees. The tapering at low temperatures may actually not be significant at all since, in most-applications, there is no compensation at such temperatures (clamped to prevent high battery voltage).

CONTROL VOLTAGE DERIVATION

Figure 10:
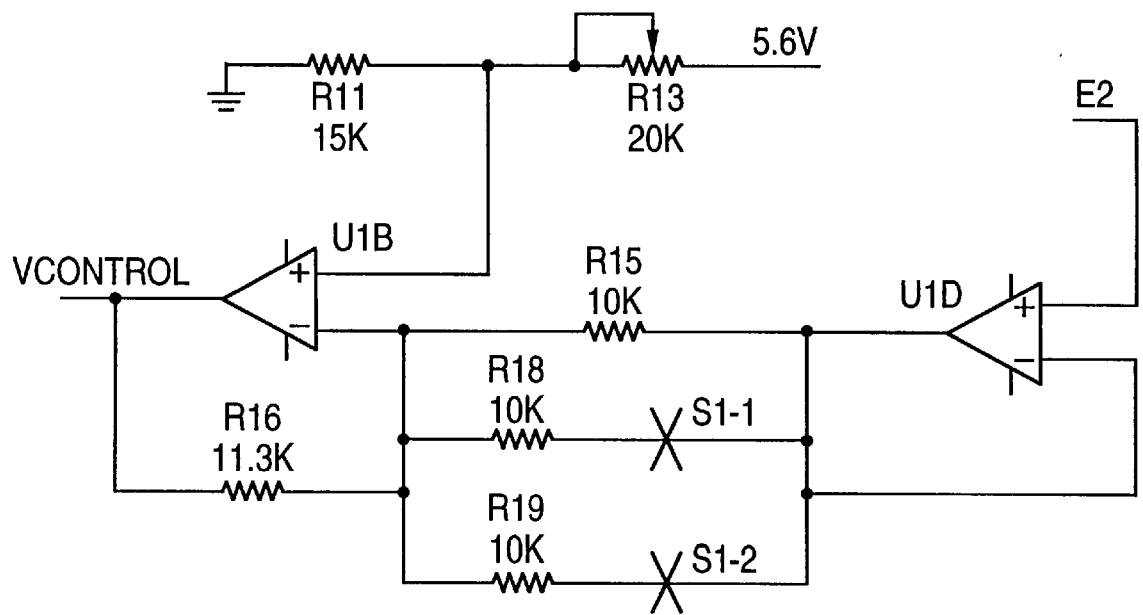
FIG. 10 is a schematic diagram of the float and slope selection circuit.

The temperature dependent voltage at E2 is buffered. The output of the buffer is fed to another op-amp circuit which will invert the signal (for negative coefficient of compensation), and add to it a customer adjustable offset voltage. This offset voltage allows the absolute control voltage to be varied equally at all temperatures. The circuit of FIG. 10 also allows the user to select one of three compensation slopes via two user accessible dip switches. Typically, the user would select the desired compensation slope, and then adjust the offset voltage pot to set the desired voltage for the temperature present at the time of installation.

Figure 8:
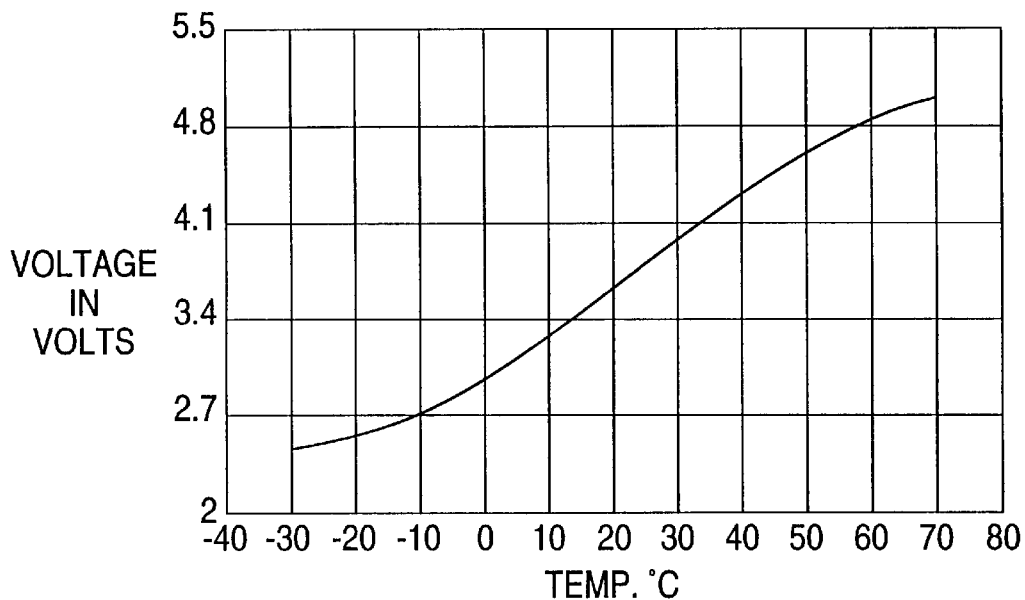
FIG. 8 is a graph of the voltage at the thermistor as a function of temperature.
Figure 9:
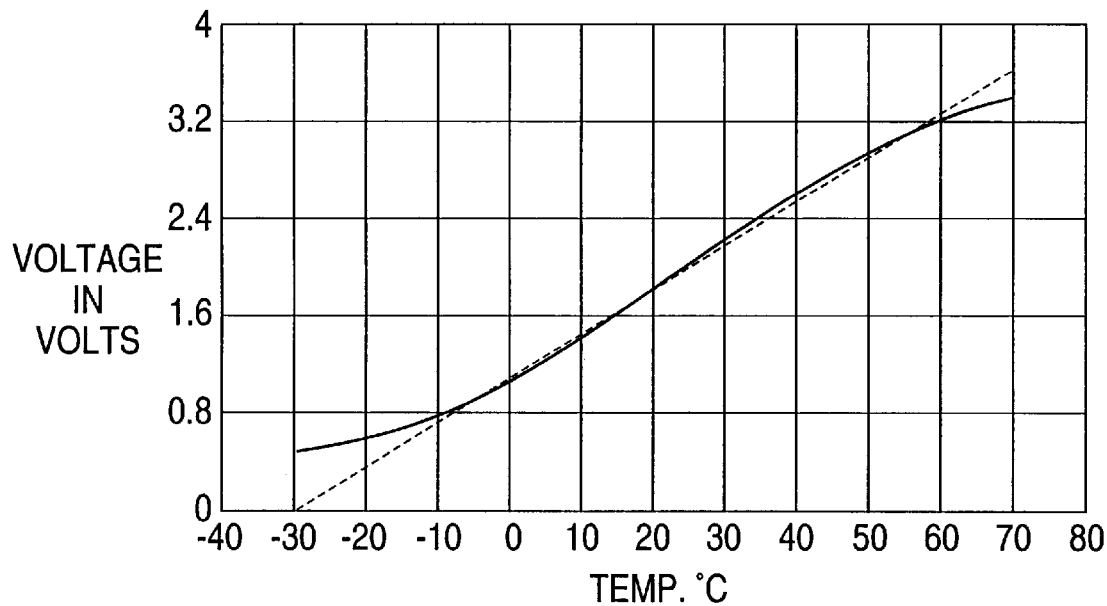
FIG. 9 is a graph of the typical voltage vs. preferred voltage for lowest slope setting.

Now, from the graph in FIG. 9, it is possible to estimate that a gain of 1.13 is necessary to match the curve in FIG. 8 to a 36 mV/deg C behaviour as specified (the desired compensation at the battery should vary at 36 mV/deg C, 72 mV/deg C, and 108 mV/deg C). The circuit of FIG. 10 will provide this function including the transformation from a positive coefficient to the desired negative. coefficient. The minimum gain of the circuit is at 1.13 for both switches OFF, 2.26 for one switch ON the other OFF, and 3.39 for both switches ON.

The output of U1B, labelled Vcontrol, must be offset or it will always be negative (or rather zero volts since no negative supply is connected). An adjustable OFFSET voltage, representing the average float voltage differential between BAT RET and RC-, is included through R11 and R13 which can be adjusted. The Vcontrol that can be set at 70 deg and minimum slope is 6.3V for a total of 54.3V on the battery. This is deemed acceptable. The minimum voltage that can be set at -30 deg and minimum slope is 50.3V on the battery.. This is deemed acceptable.

OVERVOLTAGE/UNDERVOLTAGE

Figure 11:
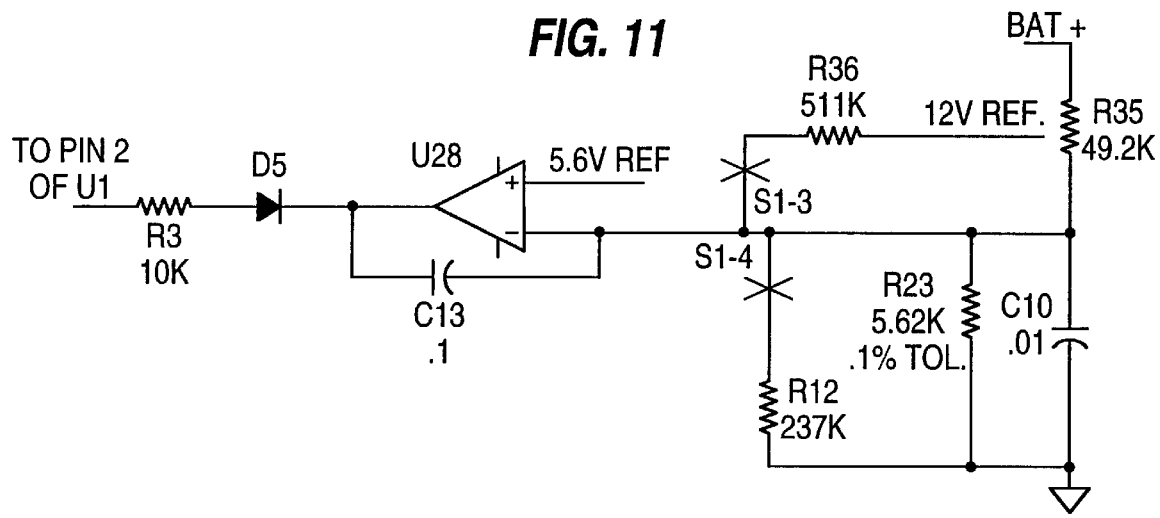
FIG. 11 is a schematic diagram of the over-voltage clamp circuit.

The circuit of FIG. 11 was the first attempt for a clamp (overvoltage in this case).

The four combinations for S1-3 and S1-4 produce the four clamping levels. The scaled version of the battery voltage is compared by U2B to an internally trimmed 5.6V reference which is virtually independent of temperature. Because the output of U2B controls U1A (34) which controls the BAT+ voltage, this is an obvious negative feedback system which must be verified for stable operation. The transfer function between the BAT+ terminal and the input at pin 2 of U1 is given as:

$$\frac{V_{pin2}}{V_{BAT}} = \frac{-1}{2(sC_{13} \cdot R_{35})} \qquad \text{Eq. 1}$$

where the factor of 2 is derived from the dividing effect of R3 with R13 (not shown). In order to ascertain that the system will not be unstable, the transfer function of the next stage (i.e., the control op-amp circuit built around 34 and 32 must be looked at. Referring to FIG. 5, and transforming the FET to a controlled current source with transconductance β and output impedance Ro, for the benefit of small signal modelling, the transfer function becomes:

$$\frac{V_{RC-}}{V_{CONTROL}} = \frac{2}{2 + sC_1 R_2 \left(1 + \frac{1}{\beta R_0}\right)} \quad \text{or approx.} \qquad \text{Eq. 2}$$

$$\frac{V_{RC-}}{V_{CONTROL}} = \frac{2}{2 + sC_1 R_1}$$

Now, the total transfer function T(s) from battery voltage to RC- voltage is given by the product of Eq.1 and Eq.2. For low frequencies, in which the TCM is the predominant small signal feedback path for the rectifiers' loop, T(s) must be added as part of their open loop gain expression. The addition of these two poles obviously hinders stability on the rectifiers; the above approach cannot be used. An alternative is to clamp the voltage from the RC- to BAT-, and rely on the user to insure the set float voltage of the rectifiers is at 48V.

Figure 12:
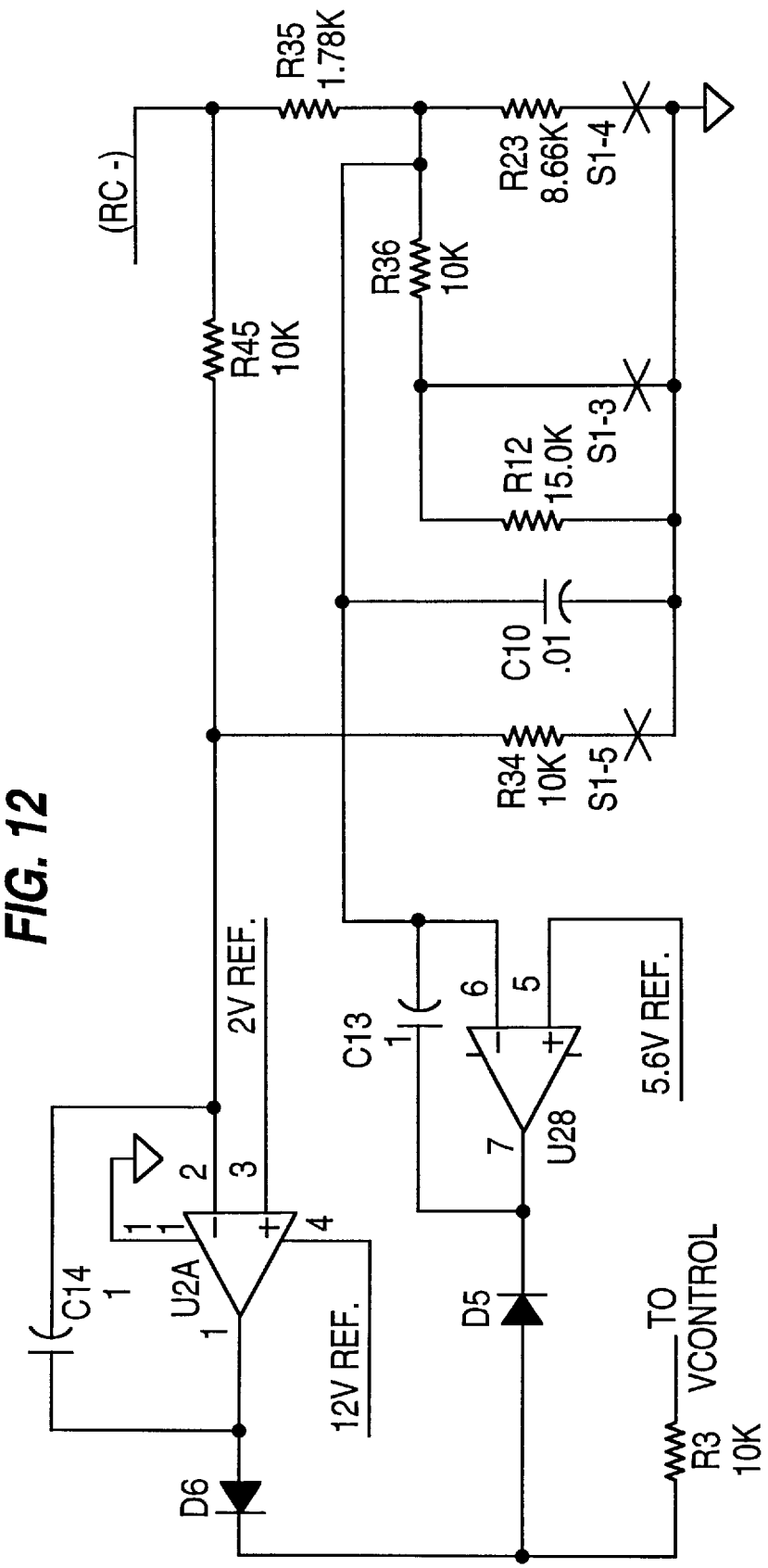
FIG. 12 is a schematic diagram of the overvoltage/undervoltage clamp circuit.

The voltage on the battery string will not be allowed to trigger either the rectifier's internal overvoltage circuit or the plant overvoltage circuit. This will avoid complete shutdown of the plant. To do this, it is sufficient clamping the voltage across 32. The clamping voltage is selectable by means of two assigned dip switches giving four possibilities of 54.00V, 54.60V, 55.15V and 55.75V. The circuit would be modified as shown in FIG. 12, with the low voltage clamp also included (selectable through a dip switch to 50.00V and 52.00V.

The transfer function of either clamps is still described by Eq.1 and Eq.2. For a stable system a sufficient condition is that the cross-over in Eq.1 coincide (or is below) the pole in Eq.2 which calculates to 161 Hz. The cross-over is calculated at 135 Hz for the upper clamp and 24 Hz for the lower clamp. In both cases stability is ensured.

FOLDBACK

Figure 13:
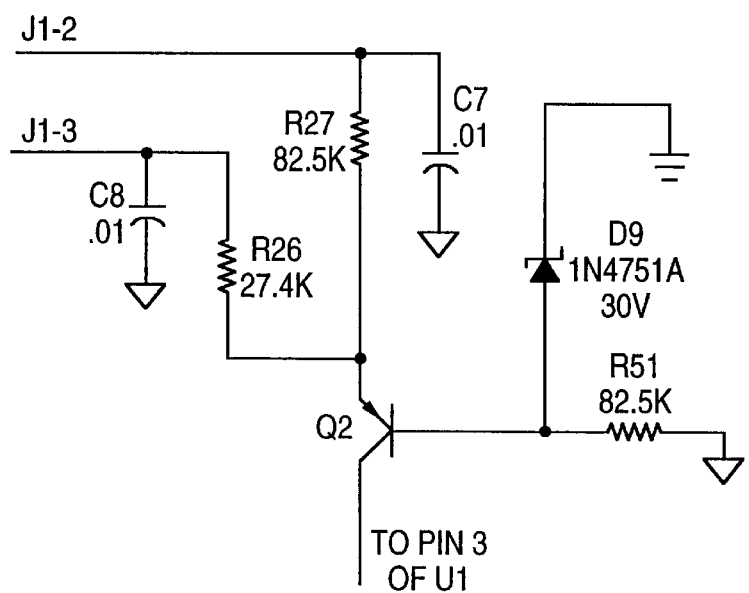
FIG. 13 is a schematic diagram of the foldback circuit;.

The user can foldback the controlled voltage by 0.7V or 2.1V. The circuit shown in FIG. 13 does this.

This circuit consists of a constant current source equal to the zener voltage minus the transistors Vbe drop divided by R27, if the user connects J1-2 to BAT+, or by R26, if the user connects J1-3 to BAT+. If both J1-2 and J1-3 are connected, the two currents are added. This current flows into the feedback resistor R2 of the controlling op-amp 34, R2 producing a corresponding drop. The expression for the foldback voltages is given below:

$$\Delta V_{F1} = \frac{(V_Z - V_{BE}) \cdot R_4}{R_{27}}$$

$$\Delta V_{F2} = \frac{(V_Z - V_{BE}) \cdot R_4}{R_{26}}$$

$$\Delta V_{F3} = \frac{V_Z - V_{BE}) \cdot (R_{26}) + R_{27}) \cdot R_4}{R_{26} \cdot R_{27}}$$

These calculate approximately to 0.7V, 2.15V, and 2.86V respectively.

TEMPERATURE ALARM

The unit will be able to accept an external probe to test temperature difference between a remote location and the unit base plate. If the temperature difference exceeds a selectable temperature of 5 deg, 10 deg, 15 deg, and 20 deg, two sets of externally available C form contacts are closed. In the absence of the external probe the temperature alarm circuit simply closes the contacts when the temperature of the base plate exceeds any of four selectable temperatures: 45 deg, 50 deg, 60 deg, and 70 deg. The selection is done through two dip switches S1–7 and S1–8 (see FIG. 15).

The voltages at E2 can be calculated for different temperatures. Referring to FIG. 8, it can be seen that the voltage at E2 is nominally 4.39V at 45 deg, 4.60V at 50 deg, 4.84V at 60 deg, and 5.02V at 70 deg. The simple comparator circuit shown in FIG. 15 can be used with P5 and P6 left floating. The temperature thresholds are selected by S1–7 and S1–8.

When the probe is inserted, a difference amplifier is automatically connected. The difference between the two probes is based on 31.86 mV/deg, which is the average rate of change of the voltage at E2 between 0 deg and 60 deg (Note: This range must be specified in the technical spec. The temperature difference needed to trip the alarm increases to about 22 deg from 15 deg if the probe is at 70 degrees.) For a 15 deg detection level, a 478 mV difference is therefore expected. Normally, with S1–8 and S1–7 in the ON and OFF position respectively, the comparator reference is 4.826V, so that the required diff-amp gain calculates to (4.826/0.478)=10.1. A gain of 10.2 can be achieved with standard parts.

It must be noted that, when the probe is connected, S1–7 must be set to OFF and S1–8 to ON for a nominal 15V detection. Other combinations of S1–7 and S1–8, however, can be used for the following nominal detection voltages:

S1–7=OFF, S1–8=OFF→15.6V
S1–7=ON, S1–8=OFF→10.0V
S1–7=ON, S1–8=ON→9.7V

Figure 14:
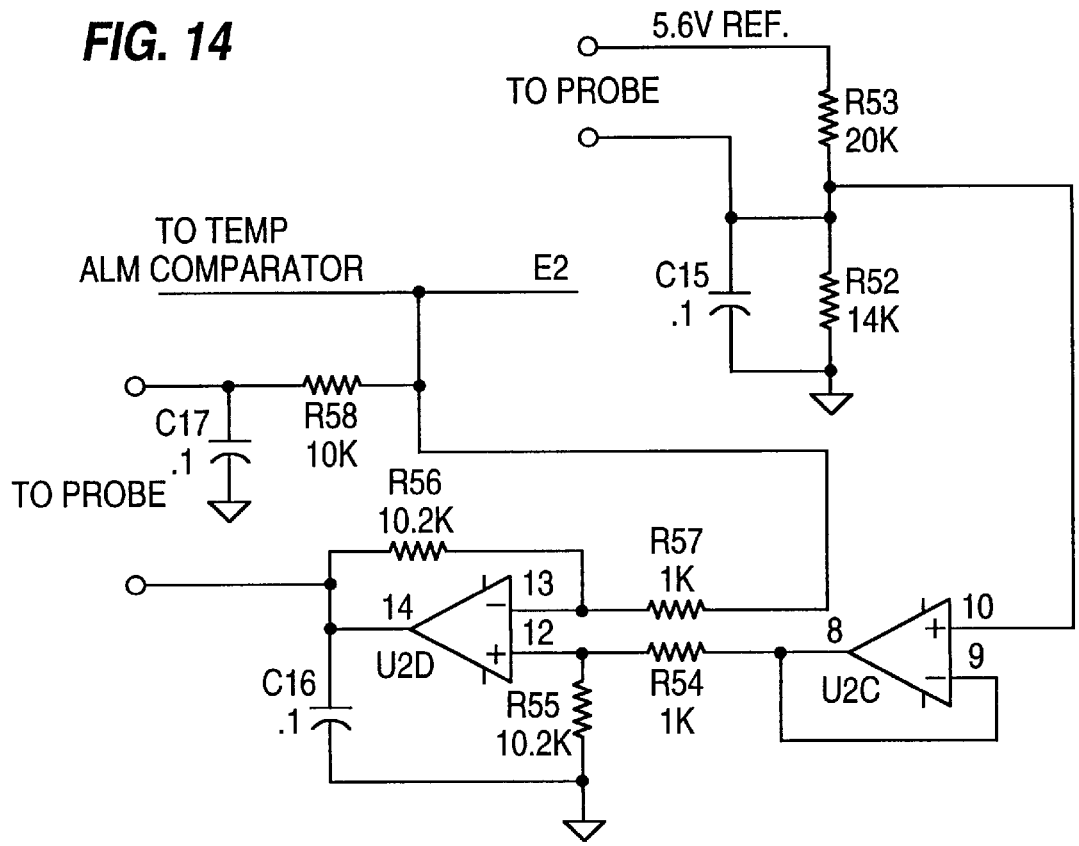
FIG. 14 is a schematic diagram of the external sensing circuit for the high temperature alarm.
Figure 15:
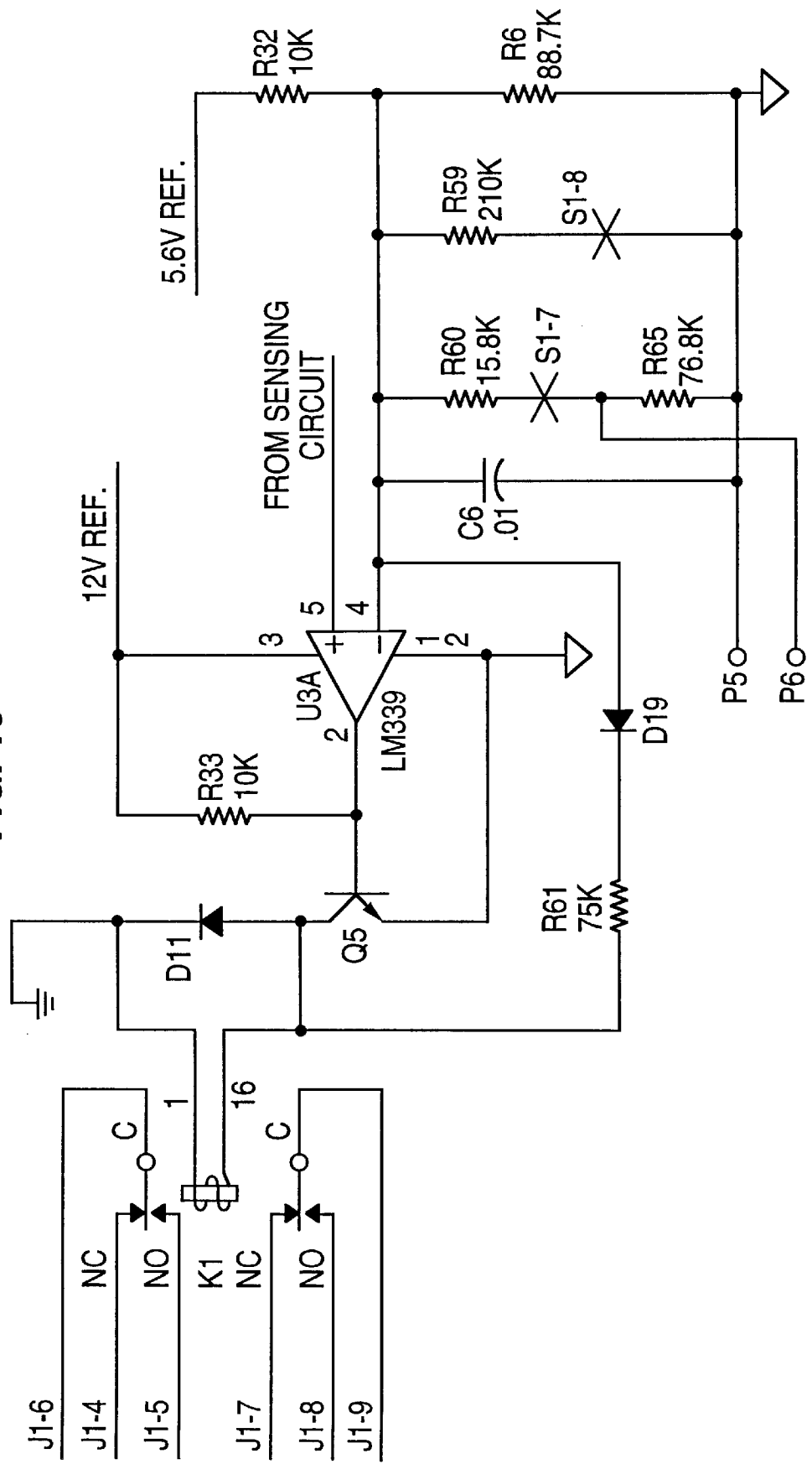
FIG. 15 is a schematic diagram of the temperature alarm circuit.

The circuits in FIGS. 14 and 15 are used.

Note the added hysteresis in the comparator circuit. It is designed to drop the reference voltage by about 0.5V after an alarm without an external probe and 0.5V and 0.25V with an external probe set at 15 deg trip and 10 deg trip respectively. This corresponds to approximately a 15 deg hysteresis when the external probe is not used, and approximately 1 deg when the probe is used.

REMOTE DISABLE CIRCUIT

Figure 16A:
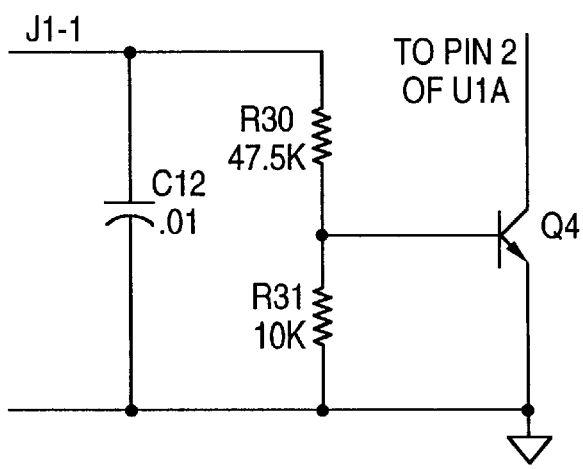
FIGS. 16A and 16B are schematic diagrams of the remote disable circuit.
Figure 16B:
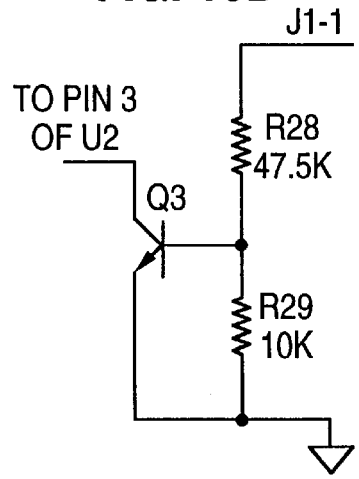

This circuit allows a remote signal to cause the rectifiers to lower their output voltage close to their setting of 48V. To do this, the reference to the control amplifier (pin 2 of U1A) is simply lowered by Q4 causing the output transistor 32 to saturate. At the same time, Q3 lowers the reference for the low clamp circuit (pin 3 of U2) preventing it from coming into the picture. The Remote Disable Circuit is shown in FIGS. 16A and 16B.

OVERCURRENT DETECTION CIRCUIT

Figure 17:
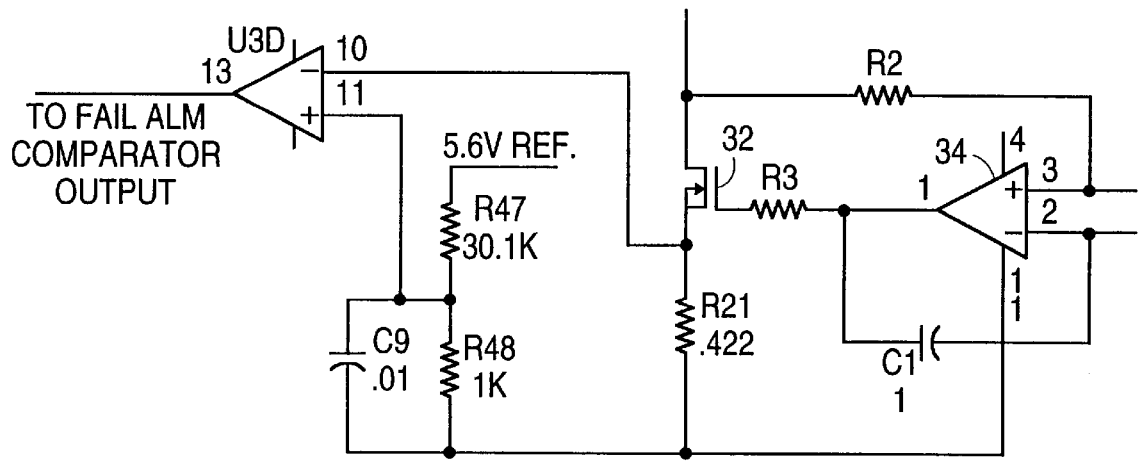
FIG. 17 is a schematic diagram of the over-current detector circuit.

In order to detect too large a number of rectifiers being connected, a current sense resistor R21 is used. The voltage it produces is compared by U3D to a reference. No hysteresis is necessary since this comparator will produce a fail alarm (see Fail Alarm Circuit in FIG. 18) which will re-route the current to the Default Drop Circuit by virtue of relay K2. The sense current will drop instantaneously resetting the comparator. Relay K2, consequently, proceeds to reset as well, allowing the current to flow again in R21, tripping again the comparator, etc. This, of course, is an oscillator. Its frequency is set by a delay introduced purposely in the loop, and more precisely in the Fail Alarm circuit as described in the next section. A flashing Fail LED on the unit will therefore tell the user that an overcurrent condition exists. The Overcurrent Detection Circuit is shown in FIG. 17.

FAILURE ALARM CIRCUIT

Figure 18:
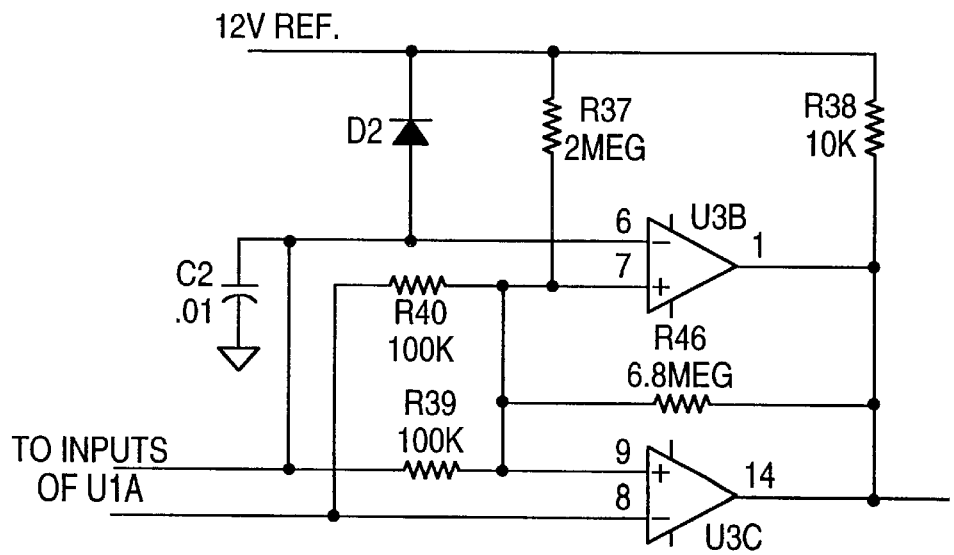
FIG. 18 is a schematic diagram of the fail alarm sensing circuit.

Failure of the TCM module is detected by checking whether the control amplifier U1A (34) is indeed "in control". This is done by comparing the input pins. If there is a difference in voltage between them the comparator circuit formed by U3B and U3C will trip low. The threshold on both comparators is defined by R37, R40 and R39 and depends on the operating point of the amplifier. At the lowest compensation point (i.e., saturation voltage on Q1 (32)) the threshold is 0.75V. At the highest compensation point (i.e., 8V on Q1 (32)) the threshold is 0.25V. The resistors are chosen very large so as to minimize loading on the control circuit. Also, resistors R14 and R4, which feed the control op-amp's inputs, are chosen to have the same value to minimize the offsetting of Vcontrol due to such loading. Hysteresis is ensured by R46 to 0.2V at lowest compensation point and 0.15V at the highest compensation point. Note that increasing R40 and R39 produces a nearly proportional increase in offset and hysteresis. The Fail Alarm sensing circuit is shown in FIG. 18. Note that the output of the overcurrent comparator is also connected at the output of this circuit.

Figure 19:
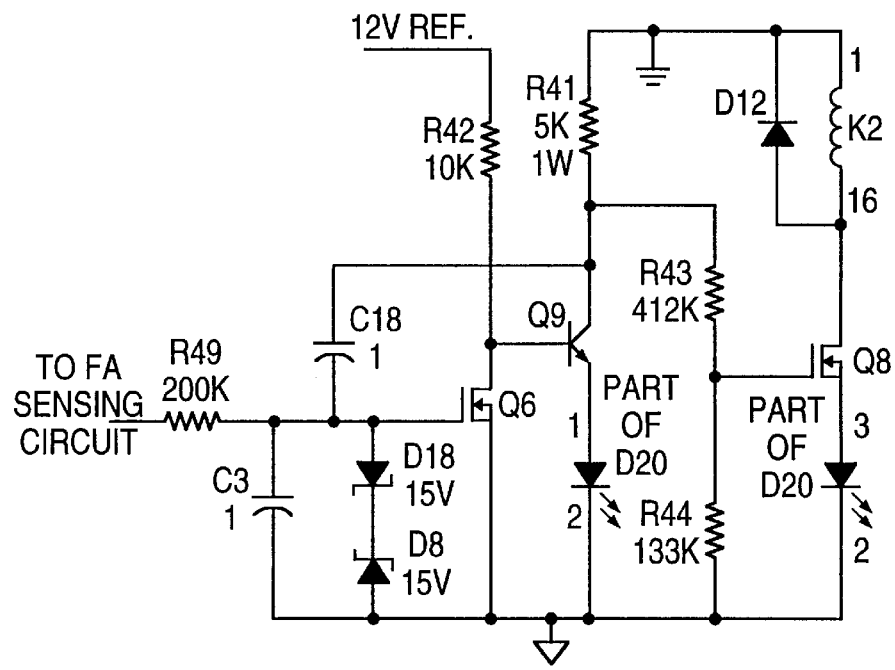
FIG. 19 is a schematic diagram of the fail alarm diagnostic circuit.

The rest of the Fail Alarm Circuit is shown in FIG. 19.

This circuit is quite straightforward. A low on the input (i.e., a fail condition) turns Q9 on and drives the RED LED in D20. Q8 turns off releasing relay K2 and turning the GREEN LED in D20 off. R49 and C3 prevent spurious fail detections to propagate to relay K2. This latter relay does two things: it extends a form-C contact transition to monitoring equipment, and it actuates the Fail Default circuit as explained in the next section. The only potentially obscure part of the circuit is the presence of C18. This capacitor becomes important if a failure occurs due to overcurrent. In this instance, the overcurrent condition is reset when K2 releases, driving K2 back on. The delay produced by C18 between these transitions will therefore determine the frequency of the oscillation. The circuit was simulated with PSPICE and provided a frequency of approximately 1 Hz during overcurrent.

FAILURE DEFAULT CIRCUIT

Figure 20:
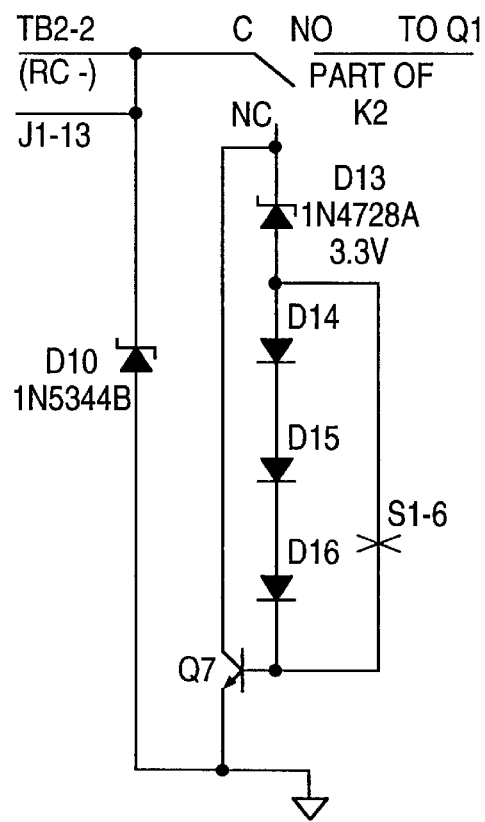
FIG. 20 is a schematic diagram of the failure default circuit.

The circuit shown in FIG. 20 is switched in when a failure is detected, replacing the TCM function. The switchover is done through K2, and the voltage drop on the remote sense leads is determined by D13 to approximately 4V or, with S1–6 OFF, by D13 through D16 to 5.6V. D10 provides redundant means to clamp the drop to less than 8.3V in case of a catastrophic failure.

It is to be understood that the foregoing description and drawings attached hereto relate only to preferred embodiments of the invention. Numerous, alterations and variations may be devised by one skilled in the art without departing from the spirit and scope of the invention.

We claim:

1. A temperature compensating battery charger device to control a charging float voltage of a battery connected to the battery charger device as a function of temperature, said battery charger device comprising:

a pair of sense leads connected to sense lead terminals on said battery charger device and across impedance means in series with the battery to be charged;

means to vary an impedance of said impedance means in response to a change in an ambient temperature; and a temperature dependent device to generate a temperature dependent voltage reference proportional to the ambient temperature.

2. A battery charger device according to claim 1, wherein said means to vary the impedance includes a power MOSFET.

3. A battery charger device according to claim 2, wherein said means to vary the impedance further includes an error amplifier that controls a gate voltage of the power MOSFET to maintain a drain voltage of the power MOSFET equal to a reference voltage of the error amplifier.

4. A battery charger device according to claim 1, wherein said temperature dependent device is a thermistor.

5. A battery charger device according to claim 3, wherein the reference voltage of the error amplifier is temperature dependent.

6. A temperature compensating battery charger device to control a charging float voltage of a battery connected to the battery charger device as a function of temperature, said battery charger device comprising:

a pair of sense leads connected to sense lead terminals on said battery charger device and across a variable impedance device in series with the battery to be charged;

said variable impedance device varies its impedance in response to a change in an ambient temperature and includes a power MOSFET and an error amplifier, wherein the error amplifier controls a gate voltage of the power MOSFET to maintain a drain voltage of the power MOSFET equal to a reference voltage of the error amplifier; and a temperature dependent device to generate the reference voltage proportional to the ambient temperature.

* * * * *